April 16, 1929. W. W. WILSON 1,709,550
DRUM BRAKE
Filed Oct. 5, 1926 3 Sheets-Sheet 1

Inventor.
William Webster Wilson
Attorney

April 16, 1929.  W. W. WILSON  1,709,550
DRUM BRAKE
Filed Oct. 5, 1926  3 Sheets-Sheet 2
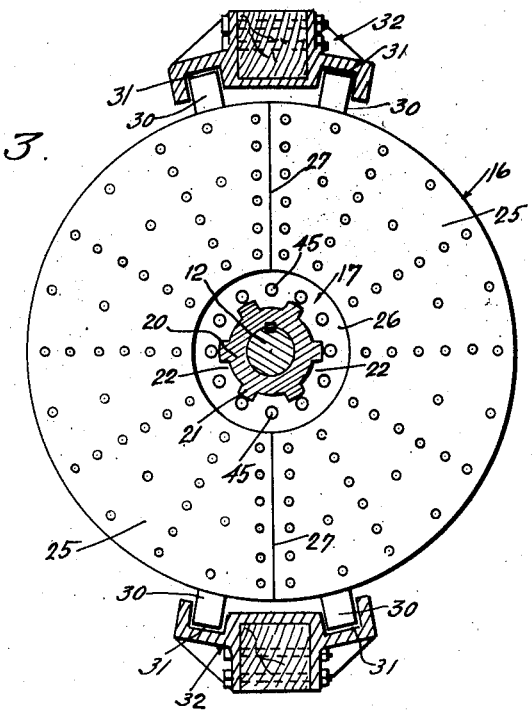
Fig. 3.
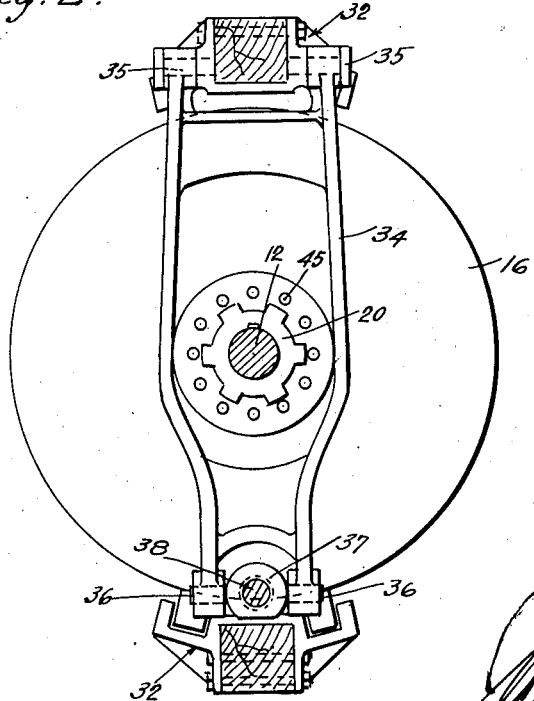
Fig. 2.
Inventor
William Webster Wilson
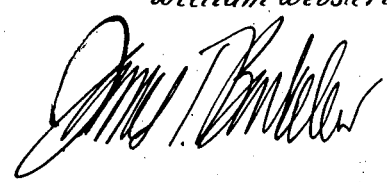
Attorney.

April 16, 1929.  W. W. WILSON  1,709,550
DRUM BRAKE
Filed Oct. 5, 1926   3 Sheets-Sheet 3

Inventor.
William Webster Wilson

Attorney.

Patented Apr. 16, 1929.

1,709,550

UNITED STATES PATENT OFFICE.

WILLIAM WEBSTER WILSON, OF LOS ANGELES, CALIFORNIA.

DRUM BRAKE.

Application filed October 5, 1926. Serial No. 139,589.

This invention has reference generally to brakes for drums and similar rotating devices or mechanisms; the invention being generally applicable wherever it is desired to obtain a brake mechanism of high braking power, efficient action and one having minimum wear. In the following specification I explain my improved brake mechanism as specifically applied to a hoisting drum of the draw works of rotary well drilling apparatus; but it will be understood that the invention is not necessarily restricted to such particular use. However, as my improved brake overcomes many difficulties heretofore experienced in brakes used on that particular apparatus, an explanation of a specific design suitable for that purpose will serve to point out the efficiencies of the invention.

It may be regarded as one of the primary objects of my invention to provide a simple and effective form of multiple disk brake to be used on such drums in place of the band brakes that have heretofore been universally used. Band brakes are, by their very nature, restricted in their total frictional area and consequently high frictional pressures per square inch must be used, resulting in great overheating of the brakes and sometimes putting such a strain on the brake bands or drums as to cause disastrous breakdowns. It is not unusual that band brakes and their brake drums fly to pieces under the very large strains imposed upon them.

In my multiple disk brake I am enabled to obtain a very large total frictional area; in fact the total frictional area in my design may be increased to any reasonable figure desired by mere duplication or extension of the construction which I describe hereinafter. And furthermore my novel brake mechanism is so designed that frictional pressures are, throughout the whole mechanism, equalized so that the forces of frictional retardation generated in the brake are uniformly distributed throughout the whole brake structure. Consequently no part of the brake is locally overheated and no great strains are put upon any part. Furthermore, the construction lends itself readily to the provision of a simple cooling arrangement. The result is a brake mechanism not liable to failure and having a long wearing life. And the design also lends itself very readily to replacement of the friction surfaces when those are worn down.

For the purpose of describing one preferred and illustrative form of brake mechanism embodying my present invention I refer to the accompanying drawings, in which:

Fig. 2 is a cross section taken on line 2—2 of Fig. 1;

Fig. 3 is a cross section taken on line 3—3 of Fig. 1;

Figure 1:
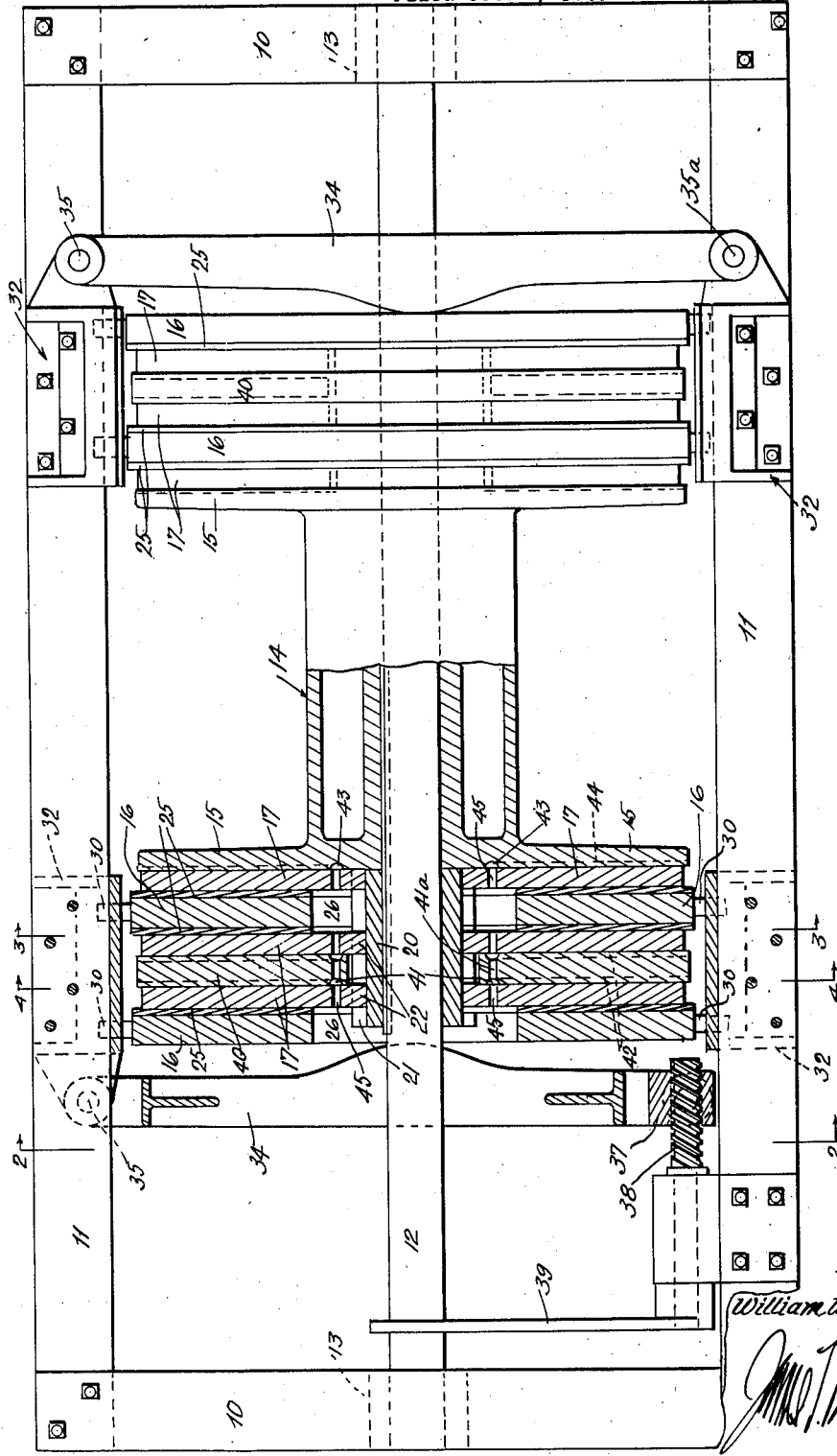
Fig. 1 is a view, partly in elevation and partly in vertical central longitudinal section, showing my improved brake mechanism applied to a winding drum of a rotary drilling rig draw works.
Figure 4:
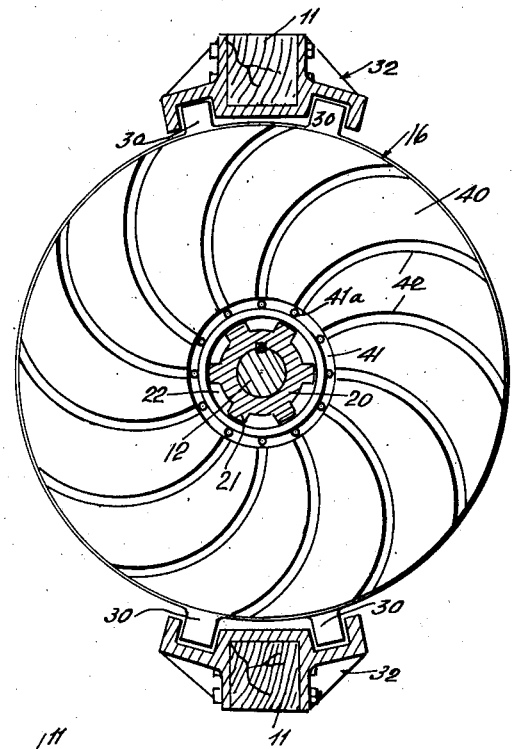
Fig. 4 is a cross section taken on line 4—4 of Fig. 1.

In the drawings I do not illustrate the whole of the mechanism of the draw works, as certain parts have no particular bearing upon my invention. Such draw works usually have a frame made up of vertical posts 10, horizontal beams 11, with horizontal drum shaft 12 mounted in bearings indicated diagrammatically at 13. At the two ends of the shaft near the bearings are usually located the driving and clutching devices for controllably driving the drum shaft and the drum 14, but as the driving mechanism plays no part in my invention I do not here attempt to illustrate it. Drum 14 is usually keyed or otherwise rotatably secured to shaft 12 and is driven through the shaft. These drums are provided with end flanges 15 and usually cylindric brake drums are carried by these end flanges, with brake bands contractible around the drums. In applying my invention to such a drum the flanges 15 are made with plane outer faces against which I place a plurality of disks that form my multiple disk brake. Typically each complete brake will comprise one or more stationary friction plates 16 arranged in alternating relation with one or more rotating friction disks 17, the friction disks being rotatably connected to drum shaft 12 and the stationary plates being held from rotation by some suitable means, and the whole set of plates and disks being compressed endwise by a suitable mechanism which will be described.

In applying my brake to a drum I prefer to apply a complete brake mechanism to each end of the drum, the two mechanisms being preferably duplicates, so that, both as to torsional strain on the drum and as to end thrust, all forces exerted through or by the braking mechanisms are equalized and balanced. Fig. 1 shows such an arrangement and as the mechanisms at the two ends of the drum are, with small exceptions, exact duplicates, I shall primarily describe in detail only one of them.

For the purpose of rotatively connecting the rotating friction disks with the drum I prefer to put upon shaft 12 a hub member 20, which has longitudinal teeth 21 in its cylindric surface, and rotating friction disks 17 have complemental teeth 22 which enter between teeth 21. The friction disks 17 are thus rotatively locked to the drum shaft but are allowed longitudinal sliding motion.

The stationary friction plates 16 are provided with facings 25 of any suitable friction material, such as brake linings, fiber, or other material which gives a large coefficient of friction without overheating and which has a comparatively long wearing life. These friction facings may be secured to plates 16 in any suitable manner, as by riveting, as is indicated in Fig. 3. The plates and their friction facings are constructed with a comparatively large central opening 26; and they are also preferably made in halves, each plate being divided into two semi-circular halves along the lines of division indicated at 27 in Fig. 3. This division into halves is for the purpose of facilitating removal of the friction plates without the necessity of removing them endwise of shaft 12, which method of removal would necessitate practically complete disasssembly of the whole draw works. By dividing these plates into halves, it is made possible to remove them readily.

To hold the friction plates in proper position and also to hold them from rotation, each half may be provided with two radially extending lugs 30 which engage in longitudinal grooves 31 formed in castings 32 bolted to beams 11. The plate halves are thus held in proper relative position, are prevented from rotating, but are allowed longitudinal sliding movement. The outermost plate 16 need only have the friction facing 25 on its inner face; the other plate or plates 16 will have friction facings on both surfaces; as is illustrated in Fig. 1.

Outside the outermost plate 16 I provide a compression lever 34 mounted at its upper end on the pivot pins 35 on upper casting 32. The lower end of lever 34 may connect, through pins 36, with a nut 37 traveling on a screw shaft 38, the screw shaft being rotated, for instance, by movement of handle 39. This arrangement of a movable compression lever 34, although it may be used for the brake mechanisms at both ends of the drum, need be used only at one end as the drum may be allowed a sufficient longitudinal movement (either on the shaft or with the shaft) to cause compression of all the friction plates and disks at both ends by pressure applied at one end only. Thus for instance, in Fig. 1 I show the lower end of the right hand compression lever 34 mounted upon pins 35ª just as its upper end is mounted upon pins 35. Lever 34 thus with this specific construction becomes in effect a stationary abutment member against which the outer friction plate 16 of the brake mechanism at the right is pressed. It will be well understood how by exerting the compressive force at one end only, and allowing a slight longitudinal movement of the brake drum on its shaft or with its shaft, both brake mechanisms will be put under equal compression and will therefore exert equal frictional retardation.

I prefer to place a rotating friction disk 17 between drum flange 15 and the innermost friction plate 16. Although the inner friction facing of the innermost plate 16 could bear directly on the outer face of flange 15, I prefer not to do this, but to interpose a plate 17 to take the surface friction. By this arrangement I am enabled to make the brake drum and its flanges of a material most suitable for their particular functions, and I can then make plate 17 of a material most suitable to give the desired frictional effect in combination with the selected facing 25. Furthermore, this arrangement permits of easy installation of the cooling air ducts 44 in the face of drum flange 15. Furthermore, between two friction plates 16 of each mechanism I prefer to place two rotating friction disks 17 separated by a spacer plate 40 which carries the cooling air ducts. By these specific arrangements I am enabled to make the rotating friction disks of a material selected solely with a view to the necessary strength, qualities of friction, and qualities of long wear. For instance, it may thus be desired to make these rotating disks of mild steel, and the cooling air ducts which I am about to describe would then have to be machined in them. But in the specific construction which I show here, spacing members 40 and also the drum and its flanges, may be constructed of cast steel and the air ducts may be cast in them without the necessity of any machining operations.

Thus I place a spacer plate 40 between the two rotating disks 17 and I provide this spacer plate in both its opposite faces and near its inner periphery with annular air grooves 41, and both faces of plate 40 then have a set of spirally arranged air ducts 42 leading out to the outer periphery. Likewise the outer face of drum flange 15 has a similar annular air channel 43 and similar air ducts 44 extending to its outer periphery. In order to introduce air freely to all the annular grooves 41 and 43, the stationary friction plates 16 are made with the large central openings before described and the rotating friction disks are provded with a circular arrangement of spaced holes 45 which register with grooves 41. When the drum and the rotating disks are revolving, the air will be thrown outwardly by centrifugal motion in the ducts 42 and 44 and will thus be drawn in through the openings 45. To provide that air shall reach the inner ends of all the ducts the spacer plate 40 also has a series of holes 41ª leading through it from one circular groove 41 to the other.

When it is necessary to renew friction facings 25 the member or members 34 may be disconnected and removed from place and then by slipping the plates and disks endwise the pins 30 of plates 16 may be slipped endwise out of grooves 31, when the halves of plates 16 may then be removed by slipping them out radially. The facings may then be repaired or replaced and the plates put back in place as easily as they were removed.

Figure 5:
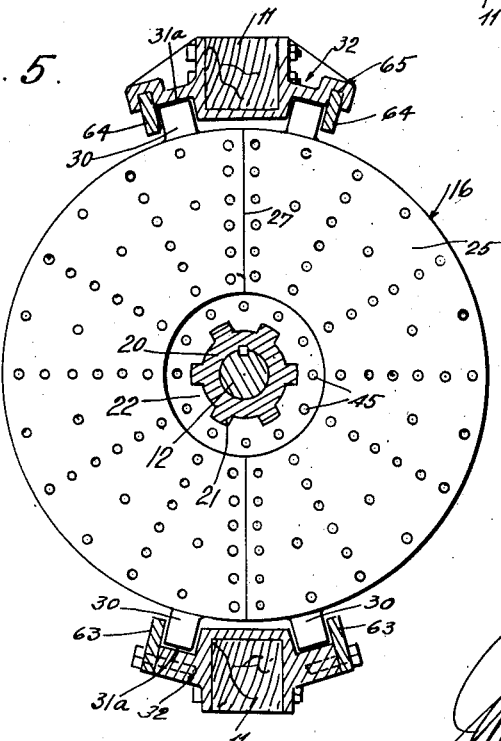
Fig. 5 is a cross section similar to Fig. 3 but showing modified constructions.
Figure 5:
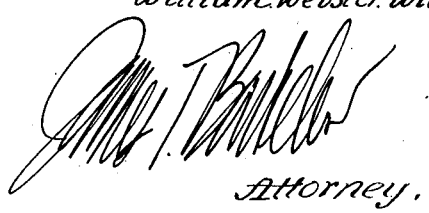

In modified forms of structure shown in Fig. 5 the plates 16, divided into halves as before, have the same lugs 30 as before described. These lugs ride in longitudinal grooves 31ª in the castings 32, but the grooves in this case are formed behind removable plates 63 or 64. Plates 63 for instance may be bolted to casting 32; or plates 64 may rest in grooves 65 in the casting so that the plates may be removed by sliding them endwise. In either case, by removal of the plates 63 or 64, the stationary friction plates 16 may be removed by direct radial outward movement of their halves, without the necessity of any preliminary longitudinal movement to remove their lugs 30 from the grooves.

From what has been said it will be readily recognized that my design and arrangement provide a brake which may be made to have as large a friction area as may be desired, it being apparent that to increase the friction area it is only necessary to increase the diameters of the disks and plates or to increase their number. All pressures and strains in the whole mechanism are evenly distributed and evenly balanced and neutralized, including end thrust pressures and all torsional strains set up by frictional retardation. The friction is confined to surfaces especially selected for that purpose; and all the friction surfaces are effectively cooled, thus again minimizing wear.

I claim:

1. In a multiple disk brake, the combination of rotative disks and stationary plates alternating therewith, and there being two rotative disks in a space between stationary plates, a spacer plate between said two rotative disks, cooling fluid ducts in the opposite faces of said stationary plate, and means for compressing the disks and plates.

2. In a multiple disk brake, the combination with a rotary shaft, of a plurality of rotative disks and stationary plates, means rotatively connecting the disks with the shaft but allowing relative longitudinal movement, means for holding the plates against rotation but allowing relative longitudinal movement, the stationary plates being provided with friction facings and being removable from position around the shaft.

3. In a multiple disk brake, the combination with a rotary shaft, of a plurality of rotative disks and stationary plates, means rotatively connecting the disks with the shaft but allowing relative longitudinal movement, means for holding the plates against rotation but allowing relative longitudinal movement, the stationary plates being provided with friction facings and being removable from position around the shaft, there being two rotating disks between adjacent stationary plates, and a spacer plate between said two disks and provided with cooling fluid ducts in its opposite faces.

4. In a multiple disk brake, the combination of a stationary plate and a rotative disk in frictional contact, means to compress the plate against the disk, a rotative shaft on which the disk is rotatively mounted, the plate surrounding the shaft and being divided into separable parts so that the parts may be removed by movement away from the shaft in a radial direction.

5. In a multiple disk brake, the combination of a stationary plate and a rotative disk in frictional contact, means to compress the plate against the disk, a rotative shaft on which the disk is rotatively mounted, the plate surrounding the shaft and being divided into separable parts so that the parts may be removed by movement away from the shaft in a radial direction, and means for holding the plates against rotation, comprising lugs on the plates and stationary longitudinal grooves in which said lugs ride, the lugs being removable from the grooves by longitudinal movement of the plates.

6. In a multiple disk brake, the combination with a rotative shaft and a frame in which said shaft is journalled, of a toothed hub on said shaft, a plurality of rotative disks engaging said toothed hub to be rotatively connected with the shaft but slidable relative thereto, stationary friction plates interposed between the rotative disks and surrounding the shaft, said plates being divided into halves, members on the frame having longitudinal grooves therein, lugs on the plate halves entering said grooves and thereby preventing rotative movement of the plates but allowing longitudinal movement thereof, there being two rotative disks between two adjacent plates, and a spacer plate between said two disks and provided in its opposite disk engaging faces with cooling fluid ducts.

7. In a multiple disk brake, the combination with a rotative shaft and a frame in which said shaft is journalled, of a toothed hub on said shaft, a plurality of rotative disks engaging said toothed hub to be rotatively connected with the shaft but slidable relative thereto, stationary friction plates interposed between the rotative disks and surrounding the shaft, said plates being divided into halves, members on the frame having longitudinal grooves therein, lugs on the plate halves entering said grooves and thereby preventing rotative movement of the plates but allowing longitudinal movement thereof, there being two rotative disks between two adjacent plates, and a spacer plate between said two disks and provided in its opposite disk engaging faces with cooling fluid ducts, the stationary plates being provided with central openings substantially larger than said toothed hub to allow longitudinal passage of air through the plates, the disks being provided with series of holes therethrough registering with the openings in the plates, and the spacer plate being provided with annular grooves registering with the holes through said disks, said grooves communicating with said ducts in the opposite faces of the spacer plate.

8. In combination with a rotative drum having opposite end flanges, a drum shaft, and a frame in which the shaft is journalled, two substantially identical brake mechanisms mounted around the shaft at opposite ends of the drum, each of said brake mechanisms embodying a longitudinally toothed hub mounted on the drum shaft, a rotative friction disk mounted on and rotatively interengaging with said hub and bearing with one face against the outer face of a drum flange, a stationary friction plate bearing against the outer face of said disk, another stationary plate spaced outwardly from said first mentioned stationary plate, two other friction disks between the two friction plates, said last mentioned friction disks being also rotatively interlocked with said hub, a spacer plate between the two said last mentioned friction disks, the stationary plates being provided with central openings somewhat larger than the hub so as to allow passage of air through the plates, all the friction disks being provided with series of holes therethrough in register with the openings in the plates, the spacer plate being provided on its two opposite faces with radially extending ducts terminating in inner annular grooves that register with said series of holes, and the spacer plate having a series of holes through it between its two opposite grooves, and the face of the flange being likewise provided with an inner annular groove registering with the holes through the friction disk and with radially extending ducts communicating with said groove; said friction plates being divided diametrically into halves, peripheral lugs on each half, and members mounted on the frame having therein longitudinal grooves taking said friction plate lugs to hold the friction plate against rotation but allowing them longitudinal movement; and means for compressing all the plates of both brake mechanisms comprising an abutment against which the outer friction plate of one mechanism bears, and a compression lever adapted to be forced against the outer friction plate of the other mechanism.

In witness that I claim the foregoing I have hereunto subscribed my name this 6th day of September, 1926.

WILLIAM WEBSTER WILSON.